April 1, 1924.
T. MIDGLEY
1,488,933
METHOD AND APPARATUS FOR TIRE MANUFACTURE
Original Filed Feb. 12, 1919
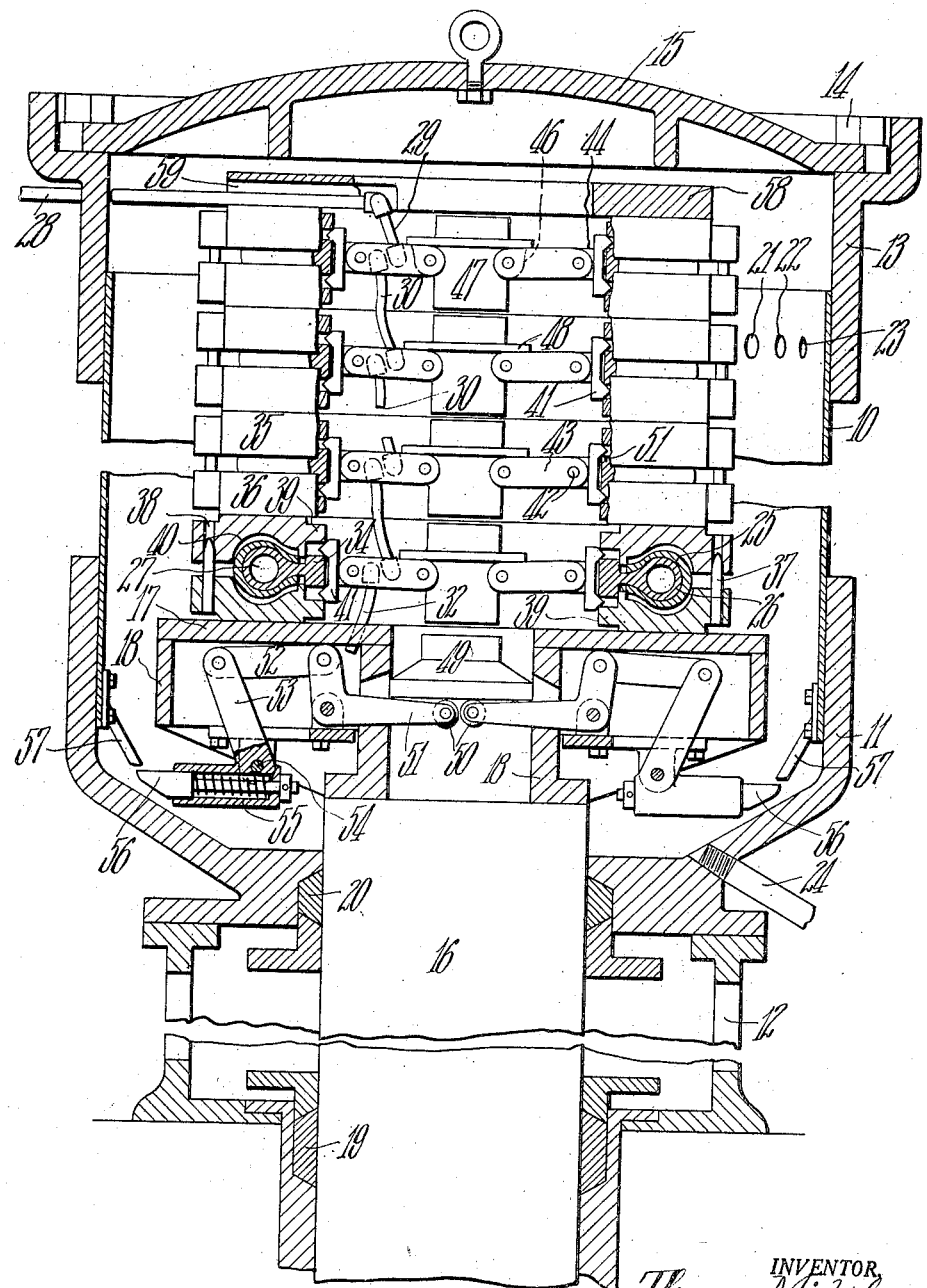
INVENTOR,
Thomas Midgley.
BY
Chapin + Neal
ATTORNEYS.

Patented Apr. 1, 1924.

1,488,933

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND APPARATUS FOR TIRE MANUFACTURE.

Application filed February 12, 1919, Serial No. 382,600. Renewed May 22, 1920.

*To all whom it may concern:*

Be it known that I, THOMAS MIDGLEY, a citizen of the United States of America, residing at Hampden, in the county of Hampden and State of Massachusetts, have invented certain new and useful Improvements in Methods and Apparatus for Tire Manufacture, of which the following is a specification.

My invention relates to an improved heating or vulcanizing chamber with associated apparatus by which one or more pneumatic tire casings may be vulcanized. It relates in particular to means for holding the molds, in which the casings are enclosed, out of contact with the casing while a part of the vulcanization is being carried out, and to means for applying the mold pressure to the tires without the necessity of opening or cooling the latter or removing the tires from the heater. It further relates to means for supplying heat to both the outside and inside of the tire casing. It further relates to a method of manufacturing tire casings in which the above steps are used.

In the manufacture of pneumatic tire casings it is necessary that the final vulcanization be carried on under considerable pressure. This pressure serves both to compact the rubber and fabric into a homogeneous mass and to give the desired shape and pattern to the outside of the tire. It is customary to apply this pressure before starting the vulcanizing heat, but this is undesirable as the rubber when cold is not in a condition to flow under pressure and distortion of the fabric layers may take place. Heating the tire before insertion in the mold is impracticable because of the difficulty of handling. My invention furnishes a ready means of heating the casing to properly condition the rubber before the mold pressure is applied.

Further utility of my invention appears in case it is desired to give to the casings a preliminary vulcanization without molding pressure prior to the final vulcanization under molding pressure. The heat for the preliminary vulcanization may be supplied in the same way as the heat for the final vulcanization, i. e., by the admission of a heated fluid to the interior of the vulcanizer pot in which the tires and molds are placed; but the preliminary vulcanization is preferably given by supplying heat to the interior of the tire casings as by admitting steam to the interior of the core on which the tires are mounted.

If the partial vulcanization is given by heat supplied from the inside, it is preferable to continue it until a substantial degree of vulcanization has been given to the carcass, leaving the tread rubber substantially unvulcanized. This both strengthens the fabric layers so that they are better able to withstand the molding pressure, and softens the tread rubber so as to assist in the molding.

In all of these processes it is desirable that there should be provided some mechanism whereby the heating may be accomplished and the mold pressure applied without the necessity of rehandling the tire for each operation or opening the heater during the vulcanization. The apparatus of my present invention is primarily designed to carry out the process described and claimed in the above mentioned application, but is equally applicable to other methods of vulcanization or tire handling, as will be apparent.

Referring to the drawings:—

The figure is a vertical section through a heater embodying my invention, with certain parts omitted and other parts shown broken away.

The heater comprises a cylinder 10 mounted on a casting 11, supported on a foundation 12. To cylinder 10 is secured a head 13 with inwardly projecting lugs 14 under which a removable cover 15 is held. Movable through the foundation and the casting 11 is a hydraulic plunger 16, under which water pressure is introduced by any suitable means. A table 17 is carried on the flanged top 18 of plunger 16. By controlling the water pressure under the plunger 16 the table may be raised and lowered, and a pile of molds and tires placed on the table can be pressed with any desired force against the cover 15. Leakage of water past the plunger 16 is prevented by stuffing boxes 19 and 20. Provision is made, as by inlets 21, 22, and 23 and outlet 24 for furnishing compressed air, steam, or water to the inside of the heater. All the above parts are old and well known in the art and need not be described further.

The tire casings 25 are mounted on ring cores 26 having internal chambers 27 to which steam or hot water may be supplied. Connection is made by an inlet pipe 28 connected to the top core by a short pipe 29. The chambers of the several cores are joined by flexible tubes 30, and the bottom core is connected to the outlet by a flexible tube 32. The inner circumferences of the cores are formed with enlarged portions or flanges 34 by which the cores are positioned as will appear later.

Surrounding each core is a split mold composed of an upper section 35 and a lower section 36. These sections are guided relative to each other by dowels 37 fastened in the lower section and running in holes 38 in the upper section. Each section has an inwardly projecting annular lug 39 by which the sections of each mold are held apart as will be described. The forming faces 40 of the mold sections are shaped to give the desired form to the tire and may be provided with raised and depressed portions which will produce a pattern or non-skid tread.

Fitting between flanges 34 of the cores and lugs 39 of the molds are double wedges 41, which when held outwardly by the toggles will hold the mold sections apart and will position the core midway between them. These wedges form part of what may be termed a toggle unit. One toggle unit is provided for each of the split molds, and preferably there are three equally spaced wedges to each unit. Each wedge is pivoted by a pin 42, to a pair of arms 43 which straddle a lug 44 on the wedge. The other ends of these arms are pinned to a lug 46 on a head 47. Head 47 is provided with a flange 48, which serves as an abutment to prevent the arms 43 swinging upwardly beyond the position shown. In this position the arms are slightly higher than the line of their pivots on head 47, and hence, once they have been placed in this position, the pressure exerted by the mold sections on the wedges will prevent the arms swinging downwardly past the line of their pivots and the breaking of the toggle thus formed.

The thickness of head 47 is preferably such that when the molds and toggle units are stacked on top of one another a slight space will be left between adjacent heads, as shown in the figure. This is to allow the toggles to be broken one at a time by the mechanism about to be described. Running in a bearing in head 18 is a block 49, whose bottom rests upon rollers 50 at the ends of bell-cranks 51, and whose top is arranged to abut against the lowest head 47. The other end of bell-crank 51 is connected by a link 52 to another bell-crank 53 pivoted at 54 to the head 18. The lower end of bell-crank 53 is formed into a tubular sleeve 55 in which runs a spring pressed pawl 56.

The outer end of this pawl is adapted to engage a depending lug 57 attached to casting 11. When the parts are in the position shown in the figure the pile of molds reaches nearly to the cover, and in this type of heater the mold pressure for the final vulcanization is obtained by forcing the pile against the cover by the hydraulic plunger 16. As the plunger is raised, the outer ends of pawls 56 catch under the lug 57 and the upper ends of bell-cranks 53 are swung outwardly causing the inner ends of bell-cranks 51 to be raised, thus raising the block 49. As this block abuts against the lowest head 47 the latter is raised, swinging toggle arms 43 past the dead center. When the toggle is thus broken the weight of the molds piled on top of the lowest one will force the wedges of that one inwardly, thus forcing the lowest head 47 upwardly until it impinges against the second from the bottom head. In this manner the breaking of the toggles proceeds successively from bottom to top of the pile. If desired the space between heads 47 may be decreased by thickening the heads so that all the toggles will be broken substantially simultaneously by the raising of block 49, but the present construction is preferable on account of the heavy shock due to the simultaneous collapse of all the molds, which are very heavy. It will be noted that the molds may be collapsed and the vulcanizing pressure applied without removing the cover from the heater. This both saves time and avoids cooling of the molds and casings with consequent loss of heat and interruption in the vulcanizing process.

A plate 58 with a cutaway portion 59 is placed on the top of the pile of molds to allow pressure to be exerted by the pile against the cover 15 without injuring the pipe 28.

On the descent of the plunger 16 pawl 56 will slip by lug 57 on account of its spring mounting. If the plunger is raised with no molds upon it or with a pile not reaching to the top of the heater the pawl 56 will be engaged by the lug as described, and will break the toggles of whatever units are supported by the plunger, but will then tilt past the lug and allow the plunger to ascend freely.

In using my invention the cover 15 is removed, the table 17 brought near the top of the heater, and the lower half of the bottom mold laid on. A core, with a tire casing built around it, is taken and a toggle unit sprung into position with the inner wedge surfaces engaging flanges 34 of the core. This core and toggle unit is then laid on the mold, the lower part of the wedges engaging lugs 39 on the mold thus securing registration of the core and mold. The tube 32 is connected, and the upper section of the mold laid on, registration being secured by the dowels 37 as well as the action of the wedges. Subsequent molds and cores are laid on in a similar manner. The wedges 41 serve to space the mold sections from each other and from the core, and to keep the core centralized. When all the molds have been laid on, the cover is clamped down and heat applied through the chamber 27 of the ring core, the outside of the casings being preferably subjected to the action of compressed air to prevent "blowing." When it is desired to apply the pressure of the molds to the tire casings it is merely necessary to admit pressure under the hydraulic plunger. The upward motion of this plunger both withdraws the wedges 41 from their operative position and forces the pile of molds against the lower side of the cover as described. The heating of the tire casings is then continued, either by continuing the supply of steam to the interior of the cores, or by admitting steam to the inside of the heater, or by both. In case it is not desired to give a partial vulcanization from the inside of the casing the connections to the cores may be omitted, and the heat supplied for the preliminary warming or vulcanization by admitting steam to the interior of the heater.

Having described my invention, I claim:

1. In a device of the class described, a core, a split mold surrounding the core for applying pressure to a tire casing mounted on the core, means for holding the sections of the mold separated, means for rendering the holding means inoperative, and means for positively forcing the sections of the mold toward each other.

2. In a device of the class described, a core, a split mold surrounding the core for applying pressure to a tire casing mounted on the core, means for holding the sections of the mold separated, means for rendering the holding means inoperative, means for positively forcing the sections of the mold toward each other, and means for applying heat to the tire casing.

3. In a device of the class described, a core, means for heating the core, a split mold surrounding the core for applying pressure to a tire casing mounted on the core, means for holding the sections of the mold separated, means for rendering the holding means inoperative, and means for positively forcing the sections of the mold toward each other.

4. In a device of the class described, a core, means for heating the core, a split mold surrounding the core for applying pressure to a tire casing mounted on the core, means for holding the sections of the mold separated, means for rendering the holding means inoperative, means for positively forcing the sections of the mold toward each other, and means for applying heat to the outside of the tire casing.

5. In a device of the class described, an annular mold split circumferentially into two sections, wedge means to separate the sections and means to maintain the wedge means in operative position.

6. In a device of the class described, an annular mold split circumferentially into two sections, a plurality of wedges engaging the sections, toggle means for causing the wedges to separate the mold sections, and means to hold said toggle means in position to maintain the mold sections separated.

7. In a device of the class described, an annular mold split circumferentially into two sections, a ring core enclosed by said mold sections, means to separate the mold sections and to position the core between them, and means to maintain the separating and positioning means in operative position.

8. In a device of the class described, a plurality of molds each split circumferentially into two sections, means for each mold to separate the mold sections and hold them in that position, and means acting successively on the holding means of all the molds to permit the mold sections to approach each other one at a time.

9. In a device of the class described, a plurality of cores, a split mold surrounding each of the cores for applying pressure to tire casings mounted on the cores, means to hold the sections of each mold separated, means for allowing the molds to close one after the other, and means to positively close the mold sections together.

10. In a device of the class described, a plurality of cores, means for heating the cores, a split mold surrounding each of the cores for applying pressure to tire casings mounted on the cores, means to hold the sections of each mold separated, means for allowing the molds to close one after the other, means to positively close the mold sections together, and means for applying heat to the outside of the tire casings.

11. In a device of the class described, a plurality of cores, a mold surrounding each of the cores for applying pressure to tire casings mounted on the cores, each mold being split circumferentially into two sections, wedge means to separate the mold sections, toggles to move the wedge means to and hold them in operative position, heads forming part of the toggles and being separated from one another slightly when the mold sections are separated, and means to cause one of the toggles to collapse, whereby the heads of the several toggles are caused to successively contact to collapse all of the toggles.

12. In a device of the class described, a heater, a plurality of molds within the heater, each split circumferentially into two sections, means for maintaining the sections of each mold separated, means controlled from outside the heater for rendering the separating means inoperative, and means for positively closing the sections of the molds together.

13. In a device of the class described, a heater, a removable cover for the heater, a plunger within the heater constructed and arranged to move towards the cover, a plurality of molds within the heater, each split circumferentially into two sections, means for maintaining the sections of each mold separated, and means controlled by the movement of the plunger for rendering the separating means inoperative.

14. In an apparatus of the class described, a heater, means for pressing together the sections of a mold located in the heater, means for holding the sections of said mold separated, and means actuated by the pressing means for rendering the holding means inoperative.

15. In an apparatus of the class described, a sectional mold, means for holding the sections separated, means for rendering the holding means inoperative, and means for closing the mold sections together.

16. An apparatus for use with tire and similar molds comprising a plurality of wedge-shaped members adapted to hold the mold shells apart and out of contact with the tire core or the like.

17. An apparatus for use with tire and similar molds comprising devices adapted to engage the mold sections and a core located therebetween, and releasable means adapted to hold said devices in position to space the mold sections from each other and from the core.

18. Apparatus for use with tire and similar molds, comprising members each formed with a pair of V-shaped projections so disposed as to provide a notch between them, and means for controlling the said members so that the said V-shaped projections thereon engage the mold shells while the said V-shaped recesses engage with the tire core or the like.

19. The method of vulcanizing a tire casing comprising locating the casing in a mold, maintaining the mold out of effective molding contact with the casing, partially vulcanizing the casing from the inside outwardly, applying pressure to the mold, and completing the vulcanization of the casing.

20. The method of vulcanizing a tire casing comprising locating the casing in a circumferentially split mold, maintaining the mold sections separated and out of effective molding contact with the casing, partially vulcanizing the casing from the inside outwardly, while the sections are so separated, closing the mold sections, and completing the vulcanization of the casing.

21. The method of vulcanizing tire casings comprising locating a plurality of casings in individual molds within a heater, holding the molds out of effective molding contact with their respective casings, partially vulcanizing the casings from the inside outwardly while the molds are so held, closing the molds upon their respective casings with a molding pressure, and completing the vulcanization of the casings.

THOMAS MIDGLEY.